United States Patent [19]

Giddings

[11] 3,997,628
[45] Dec. 14, 1976

[54] THERMALLY STABLE HIGH NITRILE RESINS AND METHOD FOR PRODUCING THE SAME

[75] Inventor: Brandford E. Giddings, Warrensville Heights, Ohio

[73] Assignee: Standard Oil Company, Cleveland, Ohio

[22] Filed: July 14, 1975

[21] Appl. No.: 595,376

[52] U.S. Cl. .................... 260/876 R; 260/827; 260/897 B; 260/898

[51] Int. Cl.² ................ C08L 51/00; C08L 53/00; C08L 33/00

[58] Field of Search ........... 260/876 R, 898, 897 B

[56] References Cited
UNITED STATES PATENTS

| | | | |
|---|---|---|---|
| 2,697,088 | 12/1954 | Stanin | 260/32.6 |
| 2,895,786 | 7/1959 | Schlack | 18/54 |
| 3,023,182 | 2/1962 | Tanabe et al. | 260/898 |
| 3,137,673 | 6/1964 | Matsubayashi | 260/898 |
| 3,137,675 | 6/1964 | Matsubayashi | 260/898 |
| 3,155,632 | 11/1964 | Matsubayashi | 260/29.6 |
| 3,161,699 | 12/1964 | Matsubayashi | 260/898 |
| 3,165,488 | 1/1965 | Itoi | 260/30.8 |

FOREIGN PATENTS OR APPLICATIONS

| | | |
|---|---|---|
| 738,503 | 7/1966 | Canada |
| 45-16460 | 8/1970 | Japan |
| 45-16461 | 8/1970 | Japan |
| 7,015,718 | 3/1970 | Netherlands |

*Primary Examiner*—Paul Lieberman
*Attorney, Agent, or Firm*—John F. Jones; Sherman J. Kemmer

[57] ABSTRACT

The present invention relates to a method for stabilizing thermoplastic nitrile resins against thermal discoloration by the inclusion in the resins of the reaction product of maleic anhydride and polyvinyl alcohol in amounts of from 0.1 to 1.5 parts by weight per 100 parts of resin.

6 Claims, No Drawings

THERMALLY STABLE HIGH NITRILE RESINS AND METHOD FOR PRODUCING THE SAME

The present invention relates to a method for stabilizing thermoplastic nitrile resins against discoloration resulting from thermal degradation during processing. More particularly, this invention relates to the stabilization of thermoplastic copolymers and graft copolymers containing a high proportionate amount of olefinic nitrile against thermal discoloration by the inclusion of minor amounts of the reaction product of maleic anhydride and polyvinyl alcohol in the polymer.

The reaction products of maleic anhydride and polyvinyl alcohol which serve as heat stabilizers are compatible with the nitrile resins of this invention, and they do not impart any appreciable haze or reduced light transmission to the resin, nor do they have any adverse effects on the physical properties of the resins when they are present within specified concentration ranges.

The reaction product of maleic anhydride and polyvinyl alcohol can be advantageously incorporated into the polymers embodied in this invention by intimately mixing or blending with the powdered polymer. Improvement in color is observed by adding the reaction product of maleic anhydride and polyvinyl alcohol in concentrations as low as about 0.1 part per hundred parts of resin, on a weight basis, and although no greater color improvement is obtained with concentrations beyond about 1.5 parts per hundred parts of resin (phr), there appears to be no adverse effect on the properties of the resin with higher concentrations. The greatest degree of color improvement, however, is obtained when the stabilizers of this invention are employed in concentrations ranging from about 0.3 to about 1.2 parts by weight per hundred parts by weight of resin.

The stabilizers of this invention are the reaction products of maleic anhydride and polyvinyl alcohol resin. These materials are readily obtained by heating together approximately stoichiometric amounts of polyvinyl alcohol and maleic anhydride to form a reaction product which is essentially insoluble in all common solvents which is believed to be because of cross-linking. Polyvinyl alcohols of a wide variety of molecular weights and degree of hydrolysis are useful in this invention. Most polyvinyl alcohols are produced by the selective hydrolysis of the corresponding resinous polyvinyl acetate by known methods.

The stabilized resins useful in this invention are composed of polymers of an olefinically unsaturated nitrile, another monomer component copolymerizable with said olefinically unsaturated nitrile, and optionally a diene rubber.

The polymers are those produced by polymerizing a major proportion of a monounsaturated nitrile, such as acrylonitrile, and a minor proportion of another monovinyl monomer component copolymerizable with said nitrile, in an aqueous medium, preferably in the presence of a preformed diene rubber which may be a homopolymer or a copolymer of a conjugated diene monomer.

The conjugated diene monomers useful in the present invention include butadiene-1,3, isoprene, chloroprene, bromoprene, cyanoprene, 2,3-dimethylbutadiene-1,3, 2-ethyl-butadiene-1,3, 2,3-diethylbutadiene-1,3, and the like, and others. Most preferred for the purpose of this invention are butadiene and isoprene because of their ready availability and their excellent copolymerization properties.

The olefinically unsaturated nitriles useful in the present invention are the alpha,beta-olefinically unsaturated mononitriles having the structure

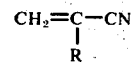

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile, and mixtures thereof.

The other monovinyl monomer component copolymerizable with the olefinically unsaturated nitriles which are useful in this invention includes one or more of the vinyl aromatic monomers, esters of olefinically unsaturated carboxylic acids, vinyl esters, vinyl ethers, alpha-olefins, and others.

The vinyl aromatic monomers include styrene, alpha-methyl styrene, the vinyl toluenes, the vinyl xylenes, and the like. Most preferred is styrene.

The esters of olefinically unsaturated carboxylic acids include those having the structure

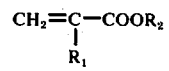

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, methyl methacrylate, and ethyl methacrylate.

The alpha-olefins useful in the present invention are those having at least 4 and as many as 10 carbon atoms and having the structure

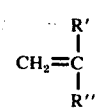

wherein R' and R'' are alkyl groups having from 1 to 7 carbon atoms, and more specifically preferred are alpha-olefins such as isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates, and the like. Most preferred is vinyl acetate.

Polymers of particular utility in this invention and details of their methods of preparation are described in U.S. Pat. Nos. 3,426,102, 3,586,737 and 3,763,278.

The polymers useful in this invention are those prepared by the polymerization of 100 parts by weight of (A) at least 50% by weight of at least one nitrile having the structure $$CH_2=C-CN$$
$$|$$
$$R$$

wherein R has the foregoing designation and (B) up to 50% by weight based on the combined weight of (A) and (B) of at least one member selected from the group consisting of (1) styrene, (2) an ester having the structure $$CH_2=C-COOR_2$$
$$|$$
$$R_1$$

wherein $R_1$ and $R_2$ have the foregoing designations, (3) an alpha-olefin having the structure $$\begin{array}{c} R' \\ | \\ CH_2=C \\ | \\ R'' \end{array}$$

wherein R' and R'' have the foregoing designations, (4) a vinyl ether selected from the group consisting of methyl vinyl ether, ethyl vinyl ether, the propyl vinyl ethers, and the butyl vinyl ethers, and (5) vinyl acetate, in the presence of from 0 to 40 parts by weight of (C) a rubbery polymer of a conjugated diene monomer selected from the group consisting of butadiene and isoprene and optionally at least one comonomer selected from the group consisting of styrene, a nitrile monomer having the structure $$CH_2=C-CN$$
$$|$$
$$R$$

wherein R has the foregoing designation, and an ester having the structure $$CH_2=C-COOR_2$$
$$|$$
$$R_1$$

wherein $R_1$ and $R_2$ have the foregoing designations, said rubbery polymer containing from 50 to 100% by weight of polymerized conjugated diene and from 0 to 50% by weight of comonomer.

Preferably, component (A) should be present in from about 60 to 90% by weight based on the combined weight of (A) and (B) and the rubbery polymer (C) should contain more than 50% by weight of conjugated diene and more preferably from 60 to 90% by weight of the conjugated diene.

The polymers useful in this invention can contain in addition to the reaction product of maleic anhydride and polyvinyl alcohol other compounding ingredients and additives, pigments, colorants, stabilizers, etc., as is well known in the art so long as the balance between impact strength, flexural strength, tensile strength, processability, heat-distortion temperature, and the like, is not affected to such a degree that the article is no longer useful for its intended purpose.

The stabilized polymeric products of the present invention are thermoplastic materials which can be thermo-formed into a wide variety of useful articles in any of the conventional ways employed with known thermoplastic polymeric materials, such as by extrusion, milling, molding, drawing, blowing, and the like. These polymers have excellent solvent resistance and their impact strength and low permeability to gases and vapors make them very useful in the packaging industry, and they are particularly useful in the manufacture of bottles, film, and other types of containers for liquids and solids.

The following examples will further illustrate the present invention in greater detail, however, it is to be understood that the scope of this invention is not to be limited by these examples.

The following polymers were prepared and used as designated in the specific examples.

Polymer A

| (1) Preparation of Elastomer | |
|---|---|
| Components | Parts by Weight |
| water | 200 |
| butadiene | 75 |
| styrene | 25 |
| t-dodecyl mercaptan | 0.7 |
| ethylenediamine tetraacetic acid, tripotassium salt (Hampol K$_3$-120) | 0.1 |
| Gafac RS-710* | 0.7 |
| potassium persulfate | 0.2 |
| polydimethyl siloxane (50% solution) (antifoam (Dow FG-10)) | 0.01 |

*α-tridecyl-ω-hydroxypoly(oxyethylene) mixture of dihydrogen phosphate and monohydrogen phosphate esters having an acid number of 58 to 70, manufactured by GAF Corporation.

To 200 parts of water were added 0.7 part of Gafac RS-710 and 0.1 part of Hampol K$_3$-120. The ingredients were stirred until well dispersed, and the pH was adjusted to 6.7 with a 25% aqueous solution of KOH. 0.2 Part of potassium persulfate was added to the reactor along with 0.7 part of t-dodecyl mercaptan dissolved in 25 parts of styrene. The reactor was purged with nitrogen, evacuated and 75 parts of butadiene were added to the mixture. The reactor was slowly heated to 60° C, and the reaction was allowed to continue for 19 hours at which time the solids level of the latex reached 27.3% by weight. 0.01 Part of Dow FG-10 antifoam agent was added to the reactor with the aid of nitrogen pressure. The reactor was slowly vented and vacuum stripping was begun while the temperature remained at 60° C. The unreacted monomers were removed over a period of 2 hours under a vacuum of 20 inches Hg. The reactor was brought to atmospheric pressure with nitrogen, and the latex was allowed to cool. The latex was then filtered through cheesecloth, and the final total solids of the filtered latex measured 29% by weight.

(2) Preparation of Graft Polymer

| Components | Parts by Weight |
| --- | --- |
| water | 250 (includes water in elastomer) |
| acrylonitrile | 75.5 |
| styrene | 24.5 |
| pentaerythritol tetrakis mercaptopropionate (Evans Q-43) | 2.1 |
| elastomer from step (1) (29% T.S.) | 51.7 (5 parts rubber) |
| Gafac RS-710 | 1.2 |
| tridecyloxypoly (ethyleneoxy) ethanol Emulphogene BC-420) | 0.8 |
| citric acid | 0.2 |
| 2,2' azobis-(α,γ-dimethyl valeronitrile) (Vazo 52) (initiator) | 0.165 |
| bis-(mixed mono- and di-nonyl phenyl phosphite) (Naugard PHR) | 0.01 |
| butylated hydroxytoluene (Naugard BHT) | 0.01 |

155 Parts of water in addition to the 37 parts of water present in the elastomer latex were charged to a reactor. To this was added with slow mixing a water-emulsifier solution containing 1.2 parts of Gafac RS-710, 0.8 part of Emulphogene BC-420, and 0.2 part of citric acid in 30 parts of water.

This was followed by the addition of 51.7 parts of the above elastomer and 8.25 parts of water with stirring. A mixture of 8 parts of acrylonitrile and 2 parts of styrene was added continuously over a period of 25 to 30 minutes. Agitation was stopped, the contents of the vessel were allowed to stand for 2 hours, and the latex was then filtered through cheesecloth.

The rubber-monomer mixture prepared above was then added to a second reactor and the first container was then rinsed into the reactor with 20 parts of water. The reactor was purged with nitrogen while being heated to 65° C. .085 Part of Vazo 52 dissolved in 0.5 part of acrylonitrile was then added to the reactor. The monomer addition of 67.5 parts of acrylonitrile, 22.5 parts of styrene, 2.1 parts of Evans Q-43, 0.01 parts of Naugard PHR, and 0.01 part of Naugard BHT was started immediately under nitrogen purge and was continued over a period of 4 hours and 20 minutes. 0.045 Part of Vazo 52 in 0.5 part of acrylonitrile was added after 1½ hours and 0.035 part of Vazo 52 in 0.5 part of acrylonitrile was added after 3½ hours. With each addition of the Vazo 52 solution, 0.5 part of acrylonitrile was used as a rinse. Vacuum stripping was begun after 4 hours and 50 minutes of reaction time. The temperature was held at 65° C while the unreacted monomers were removed under a vacuum of 18 inches Hg. The total solids content of the resulting latex was 28% by weight. The latex was coagulated in 1½ volumes of an aqueous solution of $Al_2(SO_4)_3 \cdot 18H_2O$ containing 3 grams of the aluminum salt per hundred grams of resin solids, which had been heated to a temperature of 88° to 90° C.

Polymer B

| Components | Parts by Weight |
| --- | --- |
| water | 225 |
| acrylonitrile | 77 |
| styrene | 23 |
| Gafac RE-610** | 1.35 |
| pentaerythritol tetrakis mercaptopropionate (Carlisle Q-43) | 1.65 |
| 2,2' azobis-(isobutyronitrile) (Vazo 64) | 0.16 |
| butylated hydroxytoluene | 0.01 |

**A mixture of $R-O-(CH_2CH_2O-)_nPO_3M_2$ and $[R-O-(CH_2CH_2O-)_n]_2PO_2M$ wherein n is a number from 1 to 40, R is an alkyl or alkaryl group, and M is hydrogen, ammonia or an alkali metal, produced by GAF Corporation.

195 Parts of water were charged to a reactor followed by the addition of 1.35 parts of Gafac RE-610. An additional 20 parts of water were utilized to rinse the Gafac RE-610 into the reactor.

The reactor, containing the emulsifier solution, was purged with nitrogen and heated to 70° C. The precharge, consisting of 1 part of styrene in 8 parts of acrylonitrile, was charged to the reactor followed by the addition of an additional 10 parts of water. After a period of 15 minutes, 0.1 part of Vazo 64 in 0.5 part of acrylonitrile was added to the reactor. An additional 0.5 part of acrylonitrile was added to rinse the entrance port of the reactor. The remaining water (10 parts) was then added. Another 0.03 part of Vazo 64 was added after a period of 1½ hours and 0.03 part after 3½ hours. A total of six portions of 0.5 part of acrylonitrile, 0.5 part as a solvent and 0.5 part as a rinse was used each time the initiator was added.

The addition of the monomer-chain transfer solution prepared by adding 1.65 parts of Carlisle Q-43 to 66 parts of acrylonitrile and 22 parts of styrene was begun immediately, and pumping was conducted linearly over a period of 4 hours. The reaction was continued for an additional 45 minutes and was terminated by the addition of 0.01 part of Naugard BHT. The temperature was held at 70° C while the unreacted monomers were removed under a vacuum of 20 inches Hg. The total solids content of the resulting latex was 29.5%. The latex was coagulated in 1½ volumes of water, heated to 88° to 90° C and contained 3 grams of $Al_2(SO_4)_3 \cdot 18H_2O$ per hundred grams of resin solids.

Polymer C

1. Preparation of Elastomer

An elastomer was prepared by reacting the following ingredients for 9 hours at 53° C in a nitrogen atmosphere:

| Components | Parts by Weight |
| --- | --- |
| butadiene | 70 |
| acrylonitrile | 30 |
| t-dodecyl mercaptan | 0.71 |
| P & G soap flakes | 1.4 |
| azobisisobutyronitrile | 0.4 |
| ethylenediamine tetraacetic acid | 0.05 |
| sodium salts of polymerized alkylnaphthalene sulfonic acids | 0.1 |
| water | 200 |

The final pH of the reaction mixture was 9.5 and the total solids after completion of the reaction was 30%.

2. Preparation of Graft Polymer

A graft resin was prepared utilizing the above elastomer by reacting the following components at 57° C over a period of 3.1 hours:

| Components | Parts by Weight |
| --- | --- |
| acrylonitrile | 75 |
| methyl acrylate | 25 |
| elastomer solids (obtained from (1) above) | 9 |
| sodium salt of dioctyl sulfosuccinate | 1.21 |
| polyvinylpyrrolidone | 0.3 |
| pentaerythritol tetrakis (mercaptopropionate) | 1.55 |
| potassium persulfate | 0.06 |
| antifoam (Dow FG-10) | <.04 |
| water | 230 |

All of the above materials were added initially to the reactor with agitation with the exception of the chain transfer agent, which was added 20 minutes after the start of the reaction. Completion of the reaction was determined on the basis of total solids of 28% and a conversion of 85%. The latex was coagulated in methanol with aqueous aluminum sulfate, filtered and dried.

Color Stabilizer

A mixture of 24 grams (0.52 mole) of polyvinyl alcohol, 49 grams (0.5 mole) of maleic anhydride, and 250 ml. of methyl ethyl ketone was refluxed for about 5 hours. The insoluble product was separated by filtration and was dried yielding 32.5 grams of product which was found to be insoluble in dimethyl formamide, dimethyl sulfoxide, ethanol, water, and benzene. This product was used as a color stabilizer in the following examples.

Examples 1–6

The color stabilizer described above was added to the dried powders of the polymers described in A through C above in the amount of 0.5 part by weight per hundred parts of resin, as indicated in Table 1. These resin compositions were then evaluated for their color stability and optical properties by a method based on the use of a Brabender Plasticorder. The method was designed to enable the prediction of the optical properties such as color and light transmission resulting from processing various resin batches into fabricated articles. It was found that 5- to 7-minute residence time in the Brabender at 200° C is equivalent to the total heat history that the resin would encounter during normal processing.

The instrument used consisted of a dynamometer, Type PL-U33AA (No. 2162-64), and its accompanying roller style measuring head (No. A-30/S.B.). The roller style measuring head was electrically heated and was equipped with a Rosemont temperature controller. Fifty-gram samples of each resin were screened in the Brabender set for a temperature of 210° C and 35 rpm. Four samples, approximately 1.5 grams in weight, were removed at 3-minute intervals from the Brabender for optical measurements. The initial sample was taken 4 minutes after the start of sample loading. Torque values and temperature were also noted at the 4-minute mark. Discs having a uniform thickness of 40 mils were prepared for optional measurements by pressing the fused polymer under mild conditions. The conditions selected for the pressing of discs from Brabender samples did not contribute significantly to measured optical values. The disc was prepared by placing a mold 40-mils thick and 1¼ inches in diameter in a press between two parallel mirror-finished, chromeplated brass platens, ⅛-inch thick. The platens were heated to 154° C. A 1.5-gram sample of the cooled resin removed at the various times from the Brabender was placed in each of the four cavities of the mold or in two cavities diagonally across from one another if only two discs were being processed. The heated plates containing the resin and the mold therebetween were positioned in the press so that the melt samples were pressed between the two highly polished surfaces. Fifteen thousand pounds' ram pressure was applied and held for 5 to 10 seconds. The pressure was then released and the entire unit transferred to a cold press where 20,000 pounds' ram pressure was applied. After approximately 30 seconds, the plates were sufficiently cool to handle. The unit was then removed and the discs were removed from the cavities. The percent light transmission was measured with the Hunter Lab Colormeter, and the yellowness index was determined by ASTM Standard Method D 1003-61.

It is apparent from the data shown in Table 1 that the color stabilizers of the present invention are advantageous over the control.

Table 1

| Example | Polymer | Stabilizer Concentration phr (wt.) | Yellowness Index (minutes) | | | |
| --- | --- | --- | --- | --- | --- | --- |
| | | | 4 | 7 | 10 | 13 |
| 1 | B | 0 | 15.8 | 39.7 | 67.3 | 83.4 |
| 2 | B | 0.5 | 11.7 | 19.8 | 28.4 | 39.8 |
| 3 | A (2) | 0 | 13.2 | 25.3 | 34.9 | 44.6 |
| 4 | A (2) | 0.5 | 9.1 | 12.6 | 16.1 | 19.8 |
| 5 | C (2) | 0 | 16.9 | 21.8 | 29.3 | 41.0 |
| 6 | C (2) | 0.5 | 14.2 | 18.7 | 23.6 | 32.1 |

I claim:
1. A polymer composition stable toward thermal discoloration containing from about 0.1 to about 1.5 parts by weight of the reaction product of maleic anhydride and polyvinyl alcohol wherein said polymer is composed of 100 parts by weight of the polymerization product of the monomers
   A. at least 50% by weight of at least one nitrile having the structure

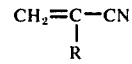

wherein R is hydrogen, a lower alkyl group having from 1 to 4 carbon atoms, or a halogen, and
   B. up to 50% by weight based on the combined weight of (A) and (B) of at least one member selected from the group consisting of
      1. styrene,
      2. an ester having the structure

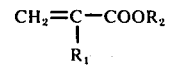

wherein $R_1$ is hydrogen, an alkyl group having from 1 to 4 carbon atoms, or a halogen, and $R_2$ is an alkyl group having from 1 to 6 carbon atoms,
      3. an alpha-olefin having the structure

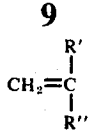

wherein R' and R'' are alkyl groups having from 1 to 7 carbon atoms,
4. a vinyl ether selected from the group consisting of methyl vinyl ether, ethyl vinyl ether, the propyl vinyl ethers, and the butyl vinyl ethers, and
5. vinyl acetate, wherein said monomers are copolymerized in the presence of from 0 to 40 parts by weight of C. a rubbery polymer of a conjugated diene monomer selected from the group consisting of butadiene and isoprene and optionally at least one comonomer selected from the group consisting of styrene, a nitrile monomer having the structure

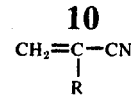

wherein R has the foregoing designation, and an ester having the structure

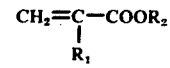

wherein $R_1$ and $R_2$ have the foregoing designations, said rubbery polymer containing from 50 to 100% by weight of polymerized conjugated diene and from 0 to 50% by weight of comonomer.

2. The composition of claim 1 wherein (A) is acrylonitrile.
3. The composition of claim 2 wherein (B) is styrene.
4. The composition of claim 2 wherein (B) is methyl acrylate.
5. The composition of claim 2 wherein (C) is a copolymer of butadiene and acrylonitrile.
6. The composition of claim 2 wherein (C) is a copolymer of butadiene and styrene.

* * * * *